US012686770B2

(12) United States Patent
Mariot et al.

(10) Patent No.: US 12,686,770 B2
(45) Date of Patent: Jul. 21, 2026

(54) SILICONE COMPOSITION FOR ELASTOMER FOAM

(71) Applicant: ELKEM SILICONES FRANCE SAS, Lyons (FR)

(72) Inventors: David Mariot, Lyons (FR); Aurélie Pelle, St Quentin Fallavier (FR); Julie Dubois, Marsolan (FR); Estelle Dervieux-Gobet, Ampuis (FR)

(73) Assignee: ELKEM SILICONES FRANCE SAS, Saint-Fons (FR)

( * ) Notice: Subject to any disclaimer, the term of this patent is extended or adjusted under 35 U.S.C. 154(b) by 1199 days.

(21) Appl. No.: 17/630,045

(22) PCT Filed: Jul. 23, 2020

(86) PCT No.: PCT/FR2020/000211
§ 371 (c)(1),
(2) Date: Jan. 25, 2022

(87) PCT Pub. No.: WO2021/014058
PCT Pub. Date: Jan. 28, 2021

(65) Prior Publication Data
US 2022/0275207 A1      Sep. 1, 2022

(30) Foreign Application Priority Data

Jul. 25, 2019    (FR) ................................. FR1908451

(51) Int. Cl.
*C08L 83/04*      (2006.01)
*C08J 9/00*       (2006.01)
*C08J 9/12*       (2006.01)
(52) U.S. Cl.
CPC ............. *C08L 83/04* (2013.01); *C08J 9/0066* (2013.01); *C08J 9/125* (2013.01); *C08J 2201/026* (2013.01); *C08J 2383/07* (2013.01)

(58) Field of Classification Search
CPC .... C08G 787/12; C08G 787/20; C08J 9/0061; C08J 9/0066; C08J 9/06; C08J 9/125; C08J 2201/026; C08J 2383/07; C08J 2483/05; C08K 3/36; C08K 5/56; C08K 2201/006; C08L 83/04; C08L 83/00
See application file for complete search history.

(56) References Cited

U.S. PATENT DOCUMENTS 5,436,274 A       7/1995  Sumpter et al.
2014/0024731 A1   1/2014  Blanc et al.

FOREIGN PATENT DOCUMENTS

CN        103180144 A      6/2013
JP        2003-226774 A    8/2003
KR        20110018876 A  * 2/2011  ............. C08L 83/04
KR        10-2013-0060315 A  6/2013
WO        2008/096882 A1   8/2008
WO        2012/032231 A1   3/2012
WO        2019/018147 A1   1/2019

OTHER PUBLICATIONS

Translation of KR-20110018876-A (Year: 2011).*
International Search Report and Written Opinion dated Nov. 12, 2020, issued in corresponding International Patent Application No. PCT/FR2020/000211, 11 pages.

* cited by examiner

*Primary Examiner* — John M Cooney
(74) *Attorney, Agent, or Firm* — BAKER BOTTS L.L.P.

(57)      ABSTRACT

Organopolysiloxane compositions are described that are crosslinkable by polyaddition and that can produce a silicone elastomer foam (or "silicone foam") having a low density, i.e. a density of less than 0.20 $g/cm^3$, and having good mechanical properties and a good fire resistance.

10 Claims, No Drawings

SILICONE COMPOSITION FOR ELASTOMER FOAM

CROSS-REFERENCE TO PRIOR APPLICATIONS

This application is a National Stage of PCT/FR2020/000211, filed Jul. 23, 2020, and designating the United States (published on Jan. 28, 2021, as WO2021/014058A1), which claims priority under 35 U.S.C. § 119 to French Patent Application No. FR1908451, filed Jul. 25, 2019, hereby expressly incorporated by reference in its entirety and assigned to the assignee hereof.

TECHNICAL FIELD

The present invention relates to novel poly-addition-crosslinking organopolysiloxane compositions, which compositions are intended to generate a foam made of silicone elastomer (referred to as "silicone foam") of low density, that is to say of less than 0.20 g/cm$^3$, and which exhibit good physical, mechanical and fire-resistance properties.

The expression "silicone foam" denotes an organopolysiloxane composition in the foam form. Materials made of silicone foam are known in various fields of application, such as thermal and/or sound insulation, the production of flexible joints, use as damping elements, and the like. These applications use the known properties of silicone elastomers, such as the thermal stability, good mechanical properties and the resistance to fire.

The transportation industry is calling for silicone foams which are of low density while retaining excellent mechanical and fire resistance properties.

Silicone foams are well known in the art and their preparation is described in a number of patents.

PRIOR ART

Several techniques exist for obtaining silicone foams. We are concerned here with the silicone foams obtained from polyaddition-crosslinking silicone compositions.

In the U.S. Pat. No. 4,189,545, silicone foams are prepared from a polyaddition-crosslinking composition comprising an organopolysiloxane carrying vinyl groups bonded to the silicon, an organopolysiloxane containing hydrogen atoms bonded to the silicon and water. The water reacts with the organopolysiloxane having hydride functional groups, thus producing gaseous hydrogen and a silanol. The silanol then reacts with the organo-polysiloxane having hydride functional groups by a hydro-condensation reaction, thus generating a second molecule of gaseous hydrogen, while another polydiorganosiloxane carrying vinyl groups bonded to the silicon will simultaneously react by an addition reaction with another polydiorganosiloxane having a hydride functional group, thus participating in the construction of the network of the silicone foam. The main contribution contributed by this technique is that the gaseous hydrogen is produced without addition of silanol to the initial composition and with the addition of a small amount of water. The fire resistance is improved by the use of quartz and of carbon black. The density of the foams obtained is high, 0.4 g/cm$^3$, and there are no measurements of mechanical properties.

In the U.S. Pat. No. 4,590,222, silicone foams are prepared from compositions comprising a linear organo-polysiloxane carrying vinyl groups bonded to the silicon, an organopolysiloxane resin carrying vinyl groups bonded to the silicon, a platinum-based catalyst, an organohydrosiloxane, an organopolysiloxane carrying hydroxyl groups on the chain-end units, a filler and an organic alcohol. In this case, the gaseous hydrogen is produced by reaction between the organic alcohol and the organohydrosiloxane.

However, the techniques employing alcohol or organopolysiloxanes carrying hydroxyl groups as source of porogenic agent have a tendency to give foams exhibiting densities which are too high for numerous applications, for example those intended for the transportation industry.

Furthermore, when success is achieved in reducing the density of the foams, this often takes place at the expense of the mechanical properties, such as, for example, the tensile strength and the tear strength.

Another technique consists in using porogenic agents or additives added to the silicone matrix which, under the action of heat, expand the material:

either by decomposition with release of gas, the case in particular of derivatives of azo type, for example azodicarbonamide, which will make it possible to release nitrogen, carbon dioxide gas and ammonia. This type of porogenic agent, despite the fact that it is widely used for other materials, presents serious problems of toxicity (release of hydrazine), or by phase change (liquid to gas), the case in particular of low-boiling-point solvents.

Finally, an alternative technique consists in mechanically introducing a gas (for example nitrogen) into the silicone matrix under pressure, followed by passage into a dynamic mixer, which makes it possible to access foams having good characteristics; however, they require bulky and expensive equipment.

Another approach, described by the United States patent No. U.S. Pat. No. 4,418,157, describes polyaddition-crosslinking compositions, which are precursors of silicone foams, comprising a silicone resin of "MQ" type (nomenclature of the silicones as described, for example, in the work by Walter Noll, "Chemistry and Technology of Silicones", Academic Press, 1968, 2nd edition, on pages 1 to 9), optionally comprising vinyl functional groups and water. The addition of this specific resin makes it possible to lower the density of the foam obtained. However, this type of resin is an expensive starting material, the industrial synthesis of which requires bulky and expensive equipment. The foams obtained exhibit a density of greater than 0.25 g/cm$^3$.

An example of a precursor composition of silicone foam exhibiting a good fire resistance is described in the reference U.S. Pat. No. 6,084,002. The composition described comprises a silicone base crosslinking by a polyaddition reaction, a compound having a hydroxyl functional group as porogenic agent and wollastonite. The viscosities of the compositions prepared in the examples are all greater than 190 000 mPa·s and the densities of the foams obtained are between 0.20 g/cm$^3$ and 0.25 g/cm$^3$.

Another problem encountered in the foams of the prior art relates to the sizes and the distribution of the sizes of the bubbles of the material made of silicone foam. This is because, when these are too large, they bring about an anisotropy in the physical properties according to the measurement points. The term "anisotropy in the physical properties" is understood to mean a variation in the values measured according to the measurement points of the silicone foam.

The term "small-sized bubbles" for a silicone foam is understood to mean bubbles, the width (or diameter) of which is less than or equal to approximately 1 mm, the term "medium-sized bubbles" is understood to mean bubbles, the width (or diameter) of which is between 1 and 1.5 mm, whereas, for "large-sized bubbles", the width (or diameter) is greater than 1.5 mm.

TECHNICAL PROBLEM

Despite the existence of the many techniques mentioned above, there still exists a need to provide industry, and in particular the transportation industry, with low-density silicone foams, that is to say of less than 0.20 g/cm³. Furthermore, these silicone foams should be visually uniform with a homogeneous distribution in the sizes of the bubbles within the foamed material, exhibit good mechanical properties and an excellent fire resistance and not give off toxic fumes during their combustion.

SUMMARY OF THE INVENTION

It is thus an objective of the present invention to provide a novel organopolysiloxane composition intended to generate, after crosslinking and/or curing, a low-density silicone foam, that is to say a density of less than 0.20 g/cm³, with sizes of bubbles the width or the diameter of which is less than or equal to approximately 2 mm, and a homogeneous distribution in the sizes of the bubbles within the material. These silicone foams should also exhibit good mechanical properties and an excellent fire resistance and not give off toxic fumes during their combustion.

The subject-matter of the invention also relates to a two-component, three-component or multicomponent system exhibiting good stability on storage which is a precursor of the organopolysiloxane composition and which is capable of generating, after its crosslinking and/or curing, a silicone foam.

Another subject-matter of the invention is the silicone foam capable of being obtained by crosslinking and/or curing of the organopolysiloxane composition exhibiting good mechanical and fire resistance properties despite a density of less than 0.2 g/cm³.

Another subject-matter of the invention is the process for the preparation of the silicone foam.

A final subject-matter of the invention relates to the use of the silicone foam according to the invention in the preparation of filling foams or foam seals in the construction, transportation, electrical insulation or domestic electrical appliance field.

DISCLOSURE OF THE INVENTION

The subject-matter of the present invention is thus an organopolysiloxane composition X, precursor of a silicone foam M, comprising:

a. at least one organopolysiloxane A exhibiting, per molecule, at least two $C_2$-$C_6$ alkenyl groups bonded to the silicon, b. at least one organopolysiloxane B exhibiting, per molecule, at least two SiH units and preferably at least three SiH units, c. a catalytically effective amount of at least one hydrosilylation catalyst C, which is preferably a compound derived from at least one metal belonging to the platinum group, d. at least one porogenic agent D which is water or an aqueous emulsion, e. at least 3% by weight, with respect to the total amount of the composition X, of at least one inorganic filler E which is a fumed silica, the specific surface of which is between 100 and 300 m²/g, f. at least 6% by weight, with respect to the total amount of the composition X, of at least one inorganic filler F which is a ground quartz, and g. at least one heat-resistance additive J, characterized in that the ratio by weight of the quartz F to the fumed silica E is between 0.5 and 4.

It is to the credit of the inventors to have developed an organopolysiloxane composition X, precursor of a silicone foam M, with a homogeneous dispersion in the size of the bubbles which makes it possible to achieve the abovementioned objectives: that is to say a density of less than 0.20 g/cm³, an excellent fire resistance and good mechanical properties, such as the tensile strength or tear strength.

DETAILED DISCLOSURE OF THE INVENTION

The organopolysiloxane A exhibiting, per molecule, at least two $C_2$-$C_6$ alkenyl groups bonded to the silicon can be in particular formed:

of at least two siloxyl units of following formula:

$$Y_a R_b^1 SiO_{\frac{(4-a-b)}{2}} \qquad \text{[Math. 1]}$$

in which:

Y is a $C_2$-$C_6$ alkenyl, preferably vinyl, $R^1$ is a monovalent hydrocarbon group having from 1 to 12 carbon atoms, preferably chosen from alkyl groups having from 1 to 8 carbon atoms, such as the methyl, ethyl or propyl groups, cycloalkyl groups having from 3 to 8 carbon atoms and aryl groups having from 6 to 12 carbon atoms, a=1 or 2, b=0, 1 or 2 and the sum a+b=2 or 3, and optionally units of following formula:

$$R_c^1 SiO_{\frac{(4-c)}{2}} \qquad \text{[Math. 2]}$$

in which $R^1$ has the same meaning as above and c=2 or 3.

Preferably, said organopolysiloxanes A are oils with a dynamic viscosity of between 100 and 100 000 mPa·s, preferably between 100 and 80 000 mPa·s, at 25° C. and more preferentially between 1000 and 50 000 mPa·s.

Unless otherwise indicated, all the viscosities with which the present disclosure is concerned correspond to a dynamic viscosity quantity at 25° C. referred to as "Newtonian", that is to say the dynamic viscosity which is measured, in a way known per se, with a Brookfield viscometer at a shear rate gradient sufficiently low for the viscosity measured to be independent of the rate gradient.

These organopolysiloxanes A exhibit a linear structure essentially formed of "D" siloxyl units chosen from the group consisting of the $Y_2SiO_{2/2}$, $YR^1SiO_{2/2}$ and $R^1_2SiO_{2/2}$ siloxyl units and of end "M" siloxyl units chosen from the group consisting of the $YR^1_2SiO_{1/2}$, $Y_2R^1SiO_{1/2}$ and $R^1_3SiO_{1/2}$ siloxyl units. The symbols Y and $R^1$ are as described above.

Mention may be made, as examples of end "M" units, of the trimethylsiloxy, dimethylphenylsiloxy, dimethylvinylsiloxy or dimethylhexenylsiloxy groups.

Mention may be made, as examples of "D" units, of the dimethylsiloxy, methylphenylsiloxy, methylvinylsiloxy, methylbutenylsiloxy, methylhexenylsiloxy, methyldecenyl-siloxy or methyldecadienylsiloxy groups.

Examples of linear organopolysiloxanes which can be unsaturated compounds A according to the invention are:

- a poly(dimethylsiloxane) comprising dimethylvinylsilyl ends;
- a poly(dimethylsiloxane-co-methylpheylsiloxane) comprising dimethylvinylsilyl ends;
- a poly(dimethylsiloxane-co-methylvinylsiloxane) comprising dimethylvinylsilyl ends;
- a poly(dimethylsiloxane-co-methylvinylsiloxane) comprising trimethylsilyl ends; and
- a cyclic poly(methylvinylsiloxane).

Preferably, the organopolysiloxane compound A has a content by weight of alkenyl unit of between 0.001% and 30%, preferably between 0.01% and 10%, preferably between 0.02% and 5%.

In the form which is most recommended, the organo-polysiloxane A contains end dimethylvinylsilyl units and more preferentially still the organopolysiloxane A is a poly (dimethylsiloxane) comprising dimethylvinylsilyl ends.

The organopolysiloxane composition X preferably comprises from 40% to 80% by weight of organopolysiloxane A, more preferentially still from 50% to 70% by weight of organopolysiloxane A.

According to one embodiment, the organopolysiloxane composition X does not comprise branched organopolysi-loxanes or resins comprising $C_2$-$C_6$ alkenyl units.

The compound B is an organohydropolysiloxane compound comprising, per molecule, at least two and preferably at least three hydrosilyl functional groups or Si—H units.

The organohydropolysiloxane B can advantageously be an organopolysiloxane comprising at least two, preferably at least three, siloxyl units of following formula:

$$H_d R_e^2 SiO_{\frac{(4-d-e)}{2}}$$ [Math. 3]

in which:

the $R^2$ radicals, which are identical or different, represent a monovalent radical having from 1 to 12 carbon atoms,
d=1 or 2, e=0, 1 or 2 and d+e=1, 2 or 3;

and optionally other units of following formula:

$$R_c^2 SiO_{\frac{(4-f)}{2}}$$ [Math. 4]

in which $R^2$ has the same meaning as above and f=0, 1, 2 or 3.

It is understood, in the formulae [Math. 3] and [Math. 4] above, that, if several $R^2$ groups are present, they can be identical to or different from one another. Preferentially, $R^2$ can represent a monovalent radical chosen from the group consisting of alkyl groups having from 1 to carbon atoms, optionally substituted by at least one halogen atom, such as chlorine or fluorine, cycloalkyl groups having from 3 to 8 carbon atoms and aryl groups having from 6 to 12 carbon atoms. $R^2$ can advantageously be chosen from the group consisting of methyl, ethyl, propyl, 3,3,3-trifluoropropyl, xylyl, tolyl and phenyl.

In the formula [Math. 3], the symbol d is preferentially equal to 1.

The organohydropolysiloxane B can exhibit a linear, branched or cyclic structure. The degree of polymerization is preferably greater than or equal to 2. Generally, it is less than 5000.

When linear polymers are concerned, the latter are essentially formed of siloxyl units chosen from the units of following formulae D: $R^2_2SiO_{2/2}$ or D': $R^2HSiO_{2/2}$ and of end siloxyl units chosen from the units of following formulae M: $R^2_3SiO_{1/2}$ or M': $R^2_2HSiO_{1/2}$ where $R^2$ has the same meaning as above.

Preferably, the viscosity of the organohydropolysiloxane B is between 1 and 5000 mPa·s, more preferentially between 1 and 2000 mPa·s and more preferentially still between 5 and 1000 mPa·s.

Examples of organohydropolysiloxanes which can be compounds B according to the invention comprising at least two hydrogen atoms bonded to a silicon atom are:

- a poly(dimethylsiloxane) comprising hydrodimethylsilyl ends;
- a poly(dimethylsiloxane-co-methylhydrosiloxane) comprising trimethylsilyl ends;
- a poly(dimethylsiloxane-co-methylhydrosiloxane) comprising hydrodimethylsilyl ends;
- a poly(methylhydrosiloxane) comprising trimethylsilyl ends; and
- a cyclic poly(methylhydrosiloxane).

When the organohydropolysiloxane B exhibits a branched structure, it is preferably chosen from the group consisting of the silicone resins of following formulae:

- M'Q, where the hydrogen atoms bonded to silicon atoms are carried by the M groups,
- MM'Q, where the hydrogen atoms bonded to silicon atoms are carried by a part of the M units,
- MD'Q, where the hydrogen atoms bonded to silicon atoms are carried by the D groups,
- MDD'Q, where the hydrogen atoms bonded to silicon atoms are carried by a part of the D groups,
- MM'TQ, where the hydrogen atoms bonded to silicon atoms are carried by a part of the M units,
- MM'DD'Q, where the hydrogen atoms bonded to silicon atoms are carried by a part of the M and D units,
- and their mixtures, with M, M', D and D' as defined above, T: siloxyl unit of formula $R^2_3SiO_{1/2}$ and Q: siloxyl unit of formula $SiO_{4/2}$, where $R^2$ has the same meaning as above.

Preferably, the organohydropolysiloxane compound B has a content by weight of hydrosilyl Si—H functional groups of between 0.2% and 91%, more preferentially between 3% and 80% and more preferentially still between 15% and 70%.

Advantageously, the molar ratio of the hydrosilyl Si—H functional groups of the compounds B to the alkene functional groups of the compounds A is between 5 and 100, preferably between 10 and 90, more preferentially between 15 and 65 and more preferentially still between 20 and 55.

A part of the hydrosilyl functional groups of the organo-hydropolysiloxane B will react with the water and form the gaseous hydrogen making possible the good foaming of the composition.

The organopolysiloxane composition X preferably comprises from 1% to 20% by weight of organohydropolysi-loxane B and more preferentially still from 3% to 15% by weight.

The hydrosilylation catalyst C can in particular be chosen from platinum and rhodium compounds but also from silicon compounds, such as those described in the patent applications WO2015004396 and WO2015004397, germanium compounds, such as those described in the patent application WO2016075414, or nickel, cobalt or iron complexes, such as those described in the patent applications WO2016071651, WO2016071652 and WO2016071654.

The catalyst C is preferably a compound derived from at least one metal belonging to the platinum group. These catalysts are well known. It is possible in particular to use complexes of platinum and of an organic product described in the patents U.S. Pat. Nos. 3,159,601, 3,159,602 and 3,220,972 and the European patents EP-A-0 057 459, EP A 0 188 978 and EP-A-0 190 530, or the complexes of platinum and of vinylated organosiloxanes described in the patents U.S. Pat. Nos. 3,419,593, 3,715,334, 3,377,432 and 3,814,730.

Preferentially, the catalyst C is a compound derived from platinum. In this case, the amount by weight of catalyst C, calculated as weight of platinum metal, is generally between 2 and 400 ppm by weight, preferably between 5 and 200 ppm, based on the total weight of the composition X.

Preferentially, the catalyst C is a Karstedt platinum catalyst.

The organopolysiloxane composition X, precursor of a silicone foam M, comprises water or an aqueous emulsion as porogenic agent D. The water can be added directly to the composition X. Advantageously, the water can be introduced in the form of an aqueous emulsion, for example a direct oil-in-water silicone emulsion or an inverse water-in-oil silicone emulsion comprising a continuous silicone oily phase, an aqueous phase and a stabilizer.

According to one embodiment, the water is introduced via an emulsion of silicone oil in water with a water content of the order of 60% by weight. When the water is introduced into the organopolysiloxane composition X via an emulsion, the dispersion of the water in the composition X and its stability on storage are improved.

Preferentially, the organopolysiloxane composition X comprises from 0.5% to 2.5% by weight of porogenic agent D.

Preferentially, the organopolysiloxane composition X comprises from 0.3% to 1.2% by weight of water, more preferentially from 0.4% to 1%.

The inorganic filler is a fumed silica E, the specific surface of which is between 100 and 300 $m^2/g$. Advantageously, the surface of the fumed silica has been treated beforehand to render it hydrophobic. This treatment can be carried out with various organosilicon compounds generally employed for this use. Thus, these organosilicon compounds can be organochlorosilanes, diorganocyclopolysiloxanes, hexaorganodisiloxanes, hexaorganodisilazanes, diorganopolysiloxanes or diorganocyclopolysilazanes (French patents FR-A-1 126 884, FR-A-1 136 885, FR-A-1 236 505, United Kingdom patent GB-A-1 024 234).

According to a preferred embodiment, the silica E is treated during the mixing with all or part of the organopolysiloxane A according to an in situ process.

According to an advantageous embodiment, the silica E is treated with one or more hexaorganodisilazanes. More preferentially still, the silica E is treated with hexamethyldisilazane, alone or as a mixture with divinyltetramethyldisilazane.

Advantageously, the organopolysiloxane composition X comprises between 3% and 14% by weight of silica E, preferably between 3% and 12% and more preferentially still between 4% and 9%. A silica content of less than 3% does not make it possible to obtain good mechanical properties. If the content of silica E is greater than 14%, the composition X exhibits a high viscosity and the density of the foam M increases.

The composition X according to the invention also contains at least one other inorganic filler which is a quartz F.

The combination of these two fillers is necessary in order to obtain a foam M with the desired properties.

Use is preferably made, as quartz F, of a ground natural quartz with a mean particle size of less than 10 microns. The quartz F can optionally be treated in order to improve its compatibility with the organopolysiloxanes.

Advantageously, the organopolysiloxane composition X comprises between 6% and 25% by weight of quartz F, preferentially between 10% and 22% by weight, more preferentially still between 13% and 20% by weight. A quartz content of less than 6% by weight does not make it possible to obtain a foam with good fire resistance. If the content of quartz F is greater than 25%, the mechanical properties of the foam M obtained after crosslinking deteriorate.

A key parameter of the organopolysiloxane composition X in order to obtain a foam M with the desired properties is the quartz/silica ratio by weight.

In order to obtain the compromise in desired properties, that is to say a silicone foam M with a density of less than 0.20 $g/cm^3$, an excellent fire resistance and good mechanical properties, such as the tensile strength or tear strength, the ratio by weight of the quartz F to the fumed silica E in the composition X has to be between 0.5 and 4.

Advantageously, the ratio by weight, of the quartz F to the fumed silica E in the composition X, is between 1 and 3.6, more advantageously between 1.5 and 3.2 and more advantageously still between 1.5 and 2.8.

The composition X according to the invention comprises at least one heat-resistance additive J. These heat-resistance additives J are well known to a person skilled in the art. They can advantageously be chosen from the group consisting of: salts, oxides and hydroxides of metals, such as iron, titanium, aluminum, nickel and copper; salts, hydroxides and oxides of rare earth metals, such as cerium and lanthanum, organophosphorus compounds, platinum derivatives, carbon black and calcium, aluminum and/or potassium silicates, such as, for example, mica and wollastonite.

Preferably, the heat-resistance additive J is chosen from the group consisting of: salts, oxides and hydroxides of iron, titanium or aluminum, salts, hydroxides and oxides of cerium and lanthanum, carbon black, mica and wollastonite.

More preferentially still, the heat-resistance additive is chosen from the group consisting of: titanium salts, oxides and hydroxides, cerium salts, hydroxides and oxides, carbon black, mica and wollastonite.

Preferably, the composition X according to the invention comprises from 0.4% to 5% by weight of heat-resistance additives J and more preferably between 0.5% and 3% by weight.

According to one embodiment, the composition X according to the invention also comprises a diorganopolysiloxane gum G comprising at least two $C_2$-$C_6$ alkenyl groups bonded to the silicon. The diorganopolysiloxane gums G are linear polymers of high molecular weight with a viscosity of greater than 1000 Pa·s at 25° C., preferably of greater than 2000 Pa·s, the diorganopolysiloxane chain of which is formed essentially of units of formula $R_2Si_{2/2}$ and blocked at each end by units of formula $R_3SiO_{1/2}$, the radical R representing an alkyl radical having from 1 to 8 carbon atoms or an alkenyl radical having from 2 to 6 carbon atoms. The presence, along the diorganopolysiloxane chain, of small amounts of units other than $R_2Si_{2/2}$, for example of $RSi_{3/2}$ and $SiO_{4/2}$ units, is not, however, excluded in the proportion of at most 2%, with respect to the number of $R_2Si_{2/2}$ units.

Advantageously, the diorganopolysiloxane gum G exhibits a content by weight of vinyl units of greater than 0.3% and preferably of greater than 0.5%. Preferably, the diorganopolysiloxane gum G exhibits a content by weight of vinyl units of between 0.5% and 6%, more preferably between 0.5% and 4% and more preferably still between 1% and 3.5%.

According to one embodiment, the composition X according to the invention comprises from 0% to 4% by weight of a diorganopolysiloxane gum G and more preferentially between 0.5% and 3% by weight.

The composition X according to the invention can also comprise other components, such as:

a diorganopolysiloxane oil H blocked at each end of its chain by a triorganosiloxy unit, the organic radicals of which bonded to the silicon atoms are chosen from alkyl radicals having from 1 to 8 carbon atoms, a crosslinking inhibiter I, a coloring base, and other fillers.

The crosslinking inhibiter I (or retardant of the addition reaction) can, for its part, be chosen from the following compounds:

an organopolysiloxane, advantageously cyclic organopolysiloxane, substituted by at least one alkenyl, tetramethylvinyltetrasiloxane being particularly preferred, pyridine, organic phosphines and phosphites, unsaturated amides, alkyl maleates, and acetylenic alcohols.

Advantageously, the inhibiter I is an acetylenic alcohol of formula:

$$(R^1)(R^2)C(OH)—C\equiv CH$$

in which formula:

$R^1$ is a linear or branched alkyl radical or a phenyl radical;

$R^2$ is a hydrogen atom, a linear or branched alkyl radical or a phenyl radical;

it being possible for the $R^1$ and $R^2$ radicals and the carbon atom located in the a position with respect to the triple bond to optionally form a ring; and the total number of carbon atoms contained in $R^1$ and $R^2$ being at least 5, preferably from 9 to 20.

Said alcohols are preferably chosen from those exhibiting a boiling point of greater than 250° C. Mention may be made, by way of examples, of the following products, which are commercially available:

1-ethynyl-1-cyclohexanol;

3-methyl-1-dodecyn-3-ol;

3,7,11-trimethyl-1-dodecyn-3-ol;

1,1-diphenyl-2-propyn-1-ol;

3-ethyl-6-ethyl-1-nonyn-3-ol and 3-methyl-1-pentadecyn-3-ol.

According to the process employed to produce the silicone foam M, the presence of the inhibiter may or may not be necessary. If need be, such a crosslinking inhibiter is present in a proportion of 3000 ppm at most, preferably in a proportion of 100 to 2000 ppm, with respect to the total weight of the organopolysiloxane composition X.

Advantageously, the crosslinking inhibiter I is 1-ethynyl-1-cyclohexanol.

As other fillers, it is possible to add, to the organopolysiloxane composition X, flame-retardant inorganic fillers in order to improve the fire resistance, such as, for example, hydrated inorganic fillers, calcium or magnesium oxides or carbonates. Preferably, the hydrated inorganic fillers are based on calcium, magnesium or aluminum, such as magnesium hydroxide $Mg(OH)_2$, aluminum hydroxide $Al(OH)_3$, hydromagnesite of empirical formula $Mg_5(CO_3)(OH)_4H_2O$, and calcium hydroxide. According to another embodiment, it will be possible to add hollow glass microspheres to the organopolysiloxane composition X.

According to one embodiment, the organopolysiloxane composition X comprises:

a. from 40% to 80% by weight of at least one organopolysiloxane A exhibiting, per molecule, at least two $C_2$-$C_6$ alkenyl groups bonded to the silicon, b. from 1% to 20% of at least one organopolysiloxane B exhibiting, per molecule, at least two SiH units and preferably at least three SiH units, c. from 2 to 400 ppm by weight of platinum metal, d. from 0.3% to 2.5% by weight of a porogenic agent D which is water or an aqueous emulsion, e. at least 3% by weight, with respect to the total amount of the composition X, of at least one inorganic filler E which is a fumed silica, the specific surface of which is between 100 and 300 $m^2/g$, f. at least 6% by weight, with respect to the total amount of the composition X, of at least one inorganic filler F which is a ground quartz, and g. from 0.4% to 5% by weight of at least one heat-resistance additive J.

According to another embodiment, the organo-polysiloxane composition X comprises:

a. from 40% to 80% by weight of at least one organopolysiloxane A exhibiting, per molecule, at least two $C_2$-$C_6$ alkenyl groups bonded to the silicon, b. from 1% to 20% by weight of at least one organopolysiloxane B exhibiting, per molecule, at least two SiH units and preferably at least three SiH units, c. from 2 to 400 ppm by weight of platinum metal, d. from 0.3% to 2.5% by weight of a porogenic agent D which is water or an aqueous emulsion, e. from 3% to 14% by weight of at least one inorganic filler E which is a fumed silica, the specific surface of which is between 100 and 300 $m^2/g$, f. from 6% to 25% by weight, with respect to the total amount of the composition X, of at least one inorganic filler F which is a ground quartz, g. from 0.4% to 5% by weight of at least one heat-resistance additive J, h. from 0 to 3000 ppm by weight of a crosslinking inhibiter I, and i. from 0% to 4% by weight of a diorganopolysiloxane gum G comprising at least two $C_2$-$C_6$ alkenyl groups bonded to the silicon.

Another subject-matter of the invention is a two-component system P, precursor of the organopolysiloxane composition X as defined in any one of the preceding claims and comprising the constituents A, B, C, D, E, F and J as defined in any one of the preceding claims, said two-component system P being characterized in that it is provided in two separate parts P1 and P2 intended to be mixed to form said organopolysiloxane composition X and comprising said constituents, and one of the parts P1 or P2 comprises the catalyst C and the porogenic agent D and does not comprise the organopolysiloxane B.

The subject-matter of the invention also relates to a three-component system T, precursor of the organo-polysiloxane composition X as defined in any one of the preceding claims and comprising the constituents A, B, C, D, E, F and J as defined in any one of the preceding claims, said three-component system T being characterized in that it is provided in three separate parts T1, T2 and T3 intended to be mixed in order to form said organopolysiloxane composition X and comprising said constituents, and one of the parts T1, T2 or T3 comprises the catalyst C and does not comprise the porogenic agent D or the organopolysiloxane B, one of the parts T1, T2 or T3 comprises the porogenic agent D and does not comprise the catalyst C or the organopolysiloxane B, one of the parts T1, T2 or T3 comprises the organopolysiloxane B and does not comprise the catalyst C or the porogenic agent D.

Other multicomponent systems can be provided in order to improve the shelf life and/or to optimize the viscosity of each of the components. According to one embodiment, it can be advantageous to separate the heat-resistance additives J from the other components and in particular from the catalyst C.

Advantageously, the viscosity of the organo-polysiloxane composition X according to the invention is less than 50 000 mPa·s and preferably less than 40 000 mPa·s. As it is a composition comprising fillers, the viscosity of the composition X is measured according to the following method. The viscosity measurements are carried out with a Haake rheometer at 25° C., equipped with a cone-plate rotor with an angle of 1° and a diameter of 20 mm. The gap between the cone and the plate is 0.053 mm. A sample of a few drops of product is deposited on the plate and then subjected to an increase in the shear stress, which varies from 0 to 20 s$^{-1}$ in 120 seconds and then from 20 to 0 s$^{-1}$ in 120 s. The viscosity is read at 10 s$^{-1}$ during the decrease in the shear stress.

Another subject-matter of the invention relates to the process for the preparation of the silicone foam M comprising the following stages:

a— providing a two-component system P, a three-component system T or a multicomponent system comprising all of the components of the organo-polysiloxane composition X as defined above, b— mixing the two parts of said two-component system P or the three parts of said three-component system T or all of the parts of the multicomponent system in order to obtain the organopolysiloxane composition X and c— leaving to crosslink and/or curing said organo-polysiloxane composition X in order to obtain the silicone foam M.

During stage b), the mixing takes place at a temperature close to ambient temperature, that is to say between 10 and 40° C. An increase in the temperature of the composition X is sometimes observed during this stage b), depending on the type of mixer and the shearing applied.

If it is desired to accelerate the crosslinking or curing of the silicone foam M, it is possible to carry out stage b) at a higher temperature, advantageously between 40 and 70° C.

Stage b) can be carried out via a low-pressure dynamic mixer directly in a mold or in a stirred vessel and then subsequently the composition X obtained can be poured into a mold. The mold where the crosslinking and curing takes place can subsequently be closed or not be closed.

It is important to have a good mixing quality in order to obtain a homogeneous silicone foam M with good mechanical properties.

Stage c) can have a duration which can vary according to the composition X and the temperature of stage b). Generally, a silicone foam M with good properties is obtained after a few minutes or a few hours depending on the temperature and on the concentration of catalyst and of inhibiter in the composition X.

Advantageously, the entire process for the manufacture of the foam M takes place while flushing with air or with nitrogen in order to avoid the risks related to the release of hydrogen during the process.

Optionally, the foam M obtained in stage 3) can undergo an annealing stage. This consists of a heat treatment with a duration of 1 to several hours, preferably of 1 to 4 hours, at a temperature of between 50 and 200° C., preferably between 100 and 150° C. This annealing stage can make it possible to improve, if necessary, the fire resistance and the mechanical properties of the silicone foam M.

Another subject-matter of the invention is the silicone foam M obtained by crosslinking and/or curing of the organopolysiloxane composition X as defined above.

The present invention also relates to the use of the organopolysiloxane composition X as defined above or of the silicone foam M as defined above in the preparation of filling or leaktightness foams and also foam seals in the construction, transportation, electrical insulation or domestic electrical appliance field.

In the transportation, in particular rail, field, this silicone foam M can be employed as padding material for seats.

EXAMPLES

Starting materials: the following compounds were used in the examples.

Vinylated organopolysiloxanes—For all the examples, the symbol Vi indicates the vinyl radical.

a1: Mixing of polydimethylsiloxanes blocked by $(CH_3)$ $ViSiO_{1/2}$ units, the viscosity of which is between 3500 and 20 000 mPa·s at 25° C.

Organohydropolysiloxanes b1: Polymethylhydrosiloxane oil blocked by $(CH_3)_3SiO_{1/2}$ units, the viscosity of which is 30 mPa·s at 25° C.

c1: Karstedt platinum catalyst.

d1: Silicone emulsion containing approximately 59.5% by weight of water.

Fumed Silicas f1: Fumed silica having a specific surface of 300 m$^2$/g treated with a mixture of hexamethyldisilazane and divinyltetramethyldisilazane.

f2: Fumed silica having a specific surface of 300 m$^2$/g treated with hexamethyldisilazane.

Quartz q1: Sikron E600® quartz: ground quartz, half the particles of which have a size of less than or equal to 4 microns.

Organopolysiloxane Gum g1: Diorganopolysiloxane gum formed essentially of dimethylsiloxane and methylvinylsiloxane units comprising 2.4% by weight of vinyl units.

i1: Mixture of additives for thermal resistance and fire resistance comprising a mixture of titanium oxide, mica and cerium hydroxide.

Inhibiter j: Solution containing 1% of ethynyl-cyclohexanol in a polydimethylsiloxane oil blocked by $(CH_3)_2(Vi)$ $SiO_{1/2}$ units, having a viscosity of 600 mPa·s at 25° C.

The compositions tested are described in table 1 below.

Description of the progression of the tests: for all the tests, the silica is mixed beforehand with a part of the vinylated organopolysiloxane. Hexamethyldisilazane, optionally divinyltetramethyldisilazane and water are added to this mixture. The mixture thus obtained is mixed under hot conditions for two hours and then subjected to a devolatilization. This is what is known as hydrophobizing treatment of the silica in situ.

Subsequently, the various components for completing the formulations described in table 1 below are added and mixed at ambient temperature. The foaming begins rapidly after manual mixing using a drill provided with a mechanical mixer at 23° C. for 30 seconds approximately. The mixture is subsequently poured into a mold.

For some tests, a stage of annealing at 140° C. for 2 hours is carried out.

The foams obtained are characterized according to the tests described below.

In the present description, the abbreviations "TeS", "EB" and "TrS" respectively represent the tensile strength in MPa, the elongation at break in % and the tear strength in MPa according to the standard AFNOR NF T 46002.

Measurement of the limiting oxygen index LOI. This index corresponds to the minimum proportion of molecular oxygen ($O_2$), expressed as % of an ($O_2+N_2$) test mixture, necessary to maintain the combustion of a sample downward, in the manner of a candle.

The sample, at ambient temperature, immersed in a stream of gas mixture in a test chimney, is brought into contact with a flame. The $O_2$ content is reduced until the critical level corresponding to the LOI is obtained. The normal atmosphere contains approximately 21% of $O_2$. If the LOI of a substance is greater than this content, it is said to be self-extinguishing; in the contrary case, it is flammable. This test makes it possible to compare the fire resistance of the different silicone foams. It is desired to obtain silicone foams with a high LOI, which represents a good fire resistance.

The properties of the different silicone foams obtained are presented in table 2 below.

TABLE 1

| % by weight | Ex. 1 | Ex. 2 | Ex. 3 | Comp. 1 | Ex. 4 | Ex. 5 | Comp. 2 | Comp. 3 |
|---|---|---|---|---|---|---|---|---|
| a1 | 60.7 | 59.3 | 59.3 | 74.1 | 56.2 | 56.5 | 62.4 | 65.7 |
| b1 | 12 | 12 | 12 | 12 | 12 | 12 | 12 | 12 |
| c1 | 0.04 | 0.04 | 0.04 | 0.04 | 0.04 | 0.04 | 0.04 | 0.04 |
| d1 | 1.15 | 1.15 | 1.15 | 1.15 | 1.15 | 1.15 | 1.15 | 1.15 |
| f1 | 0 | 0 | 1.53 | 1.53 | 0 | 1.53 | 0 | 0 |
| f2 | 6.5 | 6.5 | 5.1 | 5.1 | 9.4 | 4.0 | 3.3 | 0 |
| g1 | 0 | 1.5 | 1.5 | 1.5 | 1.5 | 1.5 | 1.5 | 1.5 |
| q1 | 15 | 15 | 15 | 0 | 15 | 18.8 | 15 | 15 |
| i1 | 3.7 | 3.7 | 3.7 | 3.7 | 3.7 | 3.7 | 3.7 | 3.7 |
| j1 | 0.8 | 1.0 | 1.0 | 0.8 | 1.0 | 0.7 | 1.0 | 1.0 |
| Quartz/ SiO2 ratio | 2.3 | 2.3 | 2.3 | 0 | 1.6 | 3.4 | 4.6 | n.d. | n.d. not determined

TABLE 2

| | Ex. 1 | Ex. 2 | Ex. 3 | Comp. 1 | Ex. 4 | Ex. 5 | Comp. 2 | Comp. 3 |
|---|---|---|---|---|---|---|---|---|
| Density (g/cm³) | 0.14 | 0.15 | 0.14 | 0.13 | 0.14 | 0.17 | 0.13 | n.d. |
| TrS (MPa) | 0.33 | 0.38 | 0.31 | 0.24 | 0.34 | 0.39 | 0.27 | n.d. |
| TeS (MPa) | 0.038 | 0.045 | 0.041 | 0.033 | 0.038 | 0.05 | 0.035 | n.d. |
| EB (%) | 60 | 70 | 60 | 80 | 55 | 55 | 70 | n.d. |
| LOI | 36 | 34 | 33 | 30 | 35 | 34 | 33 | n.d. |
| Size bubbles | 5 | 2 | 2 | 3 | 2 | 3 | 3 | n.d. | n.d. not determined

The size of the bubbles is characterized by values between 1 and 5. 1 corresponds to the smallest size of the bubbles and 5 to the greatest size. The term "small-sized bubbles" is understood to mean sizes of bubbles, the width or the diameter of which is less than or equal to approximately 1 mm (grading 2 or 3 in the table above), whereas, for "large-sized bubbles", the width or the diameter is of the order of 1.5 mm (grading 5).

The comparative tests carried out show:

that, in the absence of quartz, the fire resistance of the silicone foams obtained is low, despite the presence of heat-resistance additives, and the tear strength is less than 0.3 MPa (Comparative 1), that, in the absence of silica, the crosslinking and the foaming of the composition do not take place correctly. The foam tore and there is no part sufficiently homogeneous to carry out measurements (Comparative 3), a quartz/silica ratio by weight of greater than 4 results in weaker mechanical properties and a tear strength of less than 0.3 MPa (Comparative 2).

Examples 1 to 5 show that the compositions according to the invention make it possible to obtain a silicone foam M with an entirely satisfactory compromise in properties, namely a low density, good mechanical properties and a good fire resistance.

The invention claimed is:

1. An organopolysiloxane composition X that is a precursor of a silicone foam M, the composition X comprising:

a. from about 40% to about 80% by weight of at least one organopolysiloxane A exhibiting, per molecule, at least two $C_2$-$C_6$ alkenyl groups bonded to the silicon, b. from about 1% to about 20% of at least one organopolysiloxane B exhibiting, per molecule, at least two SiH units, c. from about 2 to about 400 ppm by weight a catalytically effective amount of at least one hydrosilylation platinum catalyst C, d. from about 0.3% to about 2.5% by weight of at least one porogenic agent D, which is water or an aqueous emulsion, e. at least about 3% by weight, with respect to the total amount of the composition X, of at least one inorganic filler E, which is a fumed silica, the specific surface of which is from about 100 m²/g to about 300 m²/g, f. at least 6% by weight, with respect to the total amount of the composition X, of at least one inorganic filler F, which is a ground quartz, g. from about 0.4% to about 5% by weight of at least one heat-resistance additive J, wherein the ratio by weight of the quartz F to the fumed silica E is from about 1.5 to about 4; and wherein the silicone foam M obtained by crosslinking and/or curing of the organopolysiloxane composition X has a limiting oxygen index of more than 33.

2. The organopolysiloxane composition X as claimed in claim 1, wherein the amount of inorganic filler E is from about 3% to about 14% by weight of said composition X.

3. The organopolysiloxane composition X as claimed in claim 1, wherein the amount of inorganic filler F is from about 6% to about 25% by weight of said composition X.

4. The organopolysiloxane composition X as claimed in claim 1, wherein the ratio by weight of the quartz F to the fumed silica E is from about 1.6 to about 3.6.

5. The organopolysiloxane composition X as claimed in claim 1, further comprising an organopolysiloxane gum G comprising at least two $C_2$-$C_6$ alkenyl groups bonded to the silicon.

6. The organopolysiloxane composition X as claimed in claim 1, further comprising an inhibiter I.

7. The organopolysiloxane composition X as claimed in claim 1, comprising:
   a. from about 40% to about 80% by weight of at least one organopolysiloxane A exhibiting, per molecule, at least two $C_2$-$C_6$ alkenyl groups bonded to the silicon,
   b. from about 1% to about 20% by weight of at least one organopolysiloxane B exhibiting, per molecule, at least two SiH units,
   c. from about 2 to about 400 ppm by weight of platinum metal,
   d. from about 0.3% to about 2.5% by weight of a porogenic agent D, which is water or an aqueous emulsion, e. from about 3% to about 14% by weight of at least one inorganic filler E, which is a fumed silica, the specific surface of which is from about 100 $m^2$/g to about 300 $m^2$/g,
   f. from about 6% to about 25% by weight, with respect to the total amount of the composition X, of at least one inorganic filler F, which is a ground quartz,
   g. from about 0.4% to about 5% by weight of at least one heat-resistance additive J,
   h. from about 0 to about 3000 ppm by weight of a crosslinking inhibiter I, and
   i. from about 0% to about 4% by weight of a diorganopolysiloxane gum G comprising at least two $C_2$-$C_6$ alkenyl groups bonded to the silicon.

8. A two-component system P, that is a precursor of the organopolysiloxane composition X as defined in claim 1 and comprising the constituents A, B, C, D, E, F and J, wherein said two-component system P comprises two separate parts P1 and P2 that are to be mixed to form the organopolysiloxane composition X and comprising said constituents, and in that one of the parts P1 or P2 comprises the catalyst C and the porogenic agent D and does not comprise the organopolysiloxane B.

9. The organopolysiloxane composition X as claimed in claim 1, wherein the at least one organopolysiloxane B exhibits, per molecule, at least three SiH units.

10. The organopolysiloxane composition X as claimed in claim 7, wherein the at least one organopolysiloxane B exhibits, per molecule, at least three SiH units.

\* \* \* \* \*